(12) United States Patent
Herzog et al.

(10) Patent No.: US 8,819,204 B2
(45) Date of Patent: Aug. 26, 2014

(54) METHOD AND DEVICE FOR OPERATING A GROUP SERVICE IN A COMMUNICATIONS NETWORK

(75) Inventors: Christian Herzog, Berlin (DE); Thomas Lüde, Berlin (DE)

(73) Assignee: Nokia Siemens Networks GmbH & Co. KG, Munich (DE)

( * ) Notice: Subject to any disclaimer, the term of this patent is extended or adjusted under 35 U.S.C. 154(b) by 1567 days.

(21) Appl. No.: 11/991,938

(22) PCT Filed: Sep. 8, 2006

(86) PCT No.: PCT/EP2006/066196
§ 371 (c)(1),
(2), (4) Date: Aug. 14, 2009

(87) PCT Pub. No.: WO2007/031474
PCT Pub. Date: Mar. 22, 2007

(65) Prior Publication Data
US 2011/0295994 A1 Dec. 1, 2011

(30) Foreign Application Priority Data
Sep. 13, 2005 (DE) .......................... 10 2005 044 857

(51) Int. Cl.
*G06F 15/173* (2006.01)
*H04W 4/06* (2009.01)
*H04M 15/00* (2006.01)
*H04W 4/24* (2009.01)
*H04W 4/08* (2009.01)

(52) U.S. Cl.
CPC ........ *H04W 4/06* (2013.01); *H04M 2215/2093* (2013.01); *H04M 15/8072* (2013.01); *H04W 4/08* (2013.01); *H04M 2215/7478* (2013.01); *H04M 15/57* (2013.01); *H04M 15/8077* (2013.01); *H04W 4/24* (2013.01); *H04M 15/00* (2013.01); *H04M 15/8066* (2013.01); *H04M 2215/7485* (2013.01); *H04M 2215/2073* (2013.01); *H04M 2215/208* (2013.01); *H04M 2215/7492* (2013.01)
USPC .......................................... 709/223; 709/206

(58) Field of Classification Search
CPC ................. H04M 15/8077; H04M 2215/2073; H04M 2215/208; H04M 2215/7485; H04M 2215/7492; H04W 4/08
USPC .......................................... 709/224, 206, 223
See application file for complete search history.

(56) References Cited

U.S. PATENT DOCUMENTS 5,675,510 A * 10/1997 Coffey et al. ................. 709/224
6,829,639 B1 * 12/2004 Lawson et al. ............... 709/224

(Continued)

FOREIGN PATENT DOCUMENTS

| DE | 10151743 A1 | 4/2003 |
| WO | WO-2004114643 A | 12/2004 |
| WO | WO-2005051007 A1 | 6/2005 |

OTHER PUBLICATIONS

OMA Open Mobile Alliance, XML Document Management Requirements, Candidate Version 1.0-17 Mar. 2005, Open Mobile Alliance, OMA-RD-XDM-V1_0-20050317-C.

(Continued)

*Primary Examiner* — Mahamed Wasel
(74) *Attorney, Agent, or Firm* — Staas & Halsey LLP

(57) ABSTRACT

A method operates a group service or several group services in a communications network. The method involves detecting specific group service and/or specific group event-related data items in an event-recording unit, transmitting at least a part of specific group service and/or specific group event-related data items from the event-recording unit to a group lists-generating unit, evaluating said specific group service and/or specific group event-related data items and generating specific group lists by said group lists-generating unit, wherein said specific group lists indicate the current participation state of the group participants to the group service or to each group service.

24 Claims, 1 Drawing Sheet

(56) References Cited

U.S. PATENT DOCUMENTS

| | | | |
|---|---|---|---|
| 7,539,505 B2* | 5/2009 | Wajda et al. | 455/518 |
| 7,864,716 B1* | 1/2011 | Manroa et al. | 370/260 |
| 8,090,771 B2* | 1/2012 | Kimoto et al. | 709/203 |
| 8,117,181 B2* | 2/2012 | Matthiesen et al. | 707/709 |
| 8,140,980 B2* | 3/2012 | Gunasekar et al. | 715/753 |
| 2004/0095467 A1* | 5/2004 | Koizumi | 348/169 |
| 2005/0034079 A1* | 2/2005 | Gunasekar et al. | 715/753 |
| 2005/0190740 A1* | 9/2005 | Zhao et al. | 370/349 |
| 2006/0003781 A1* | 1/2006 | Jin et al. | 455/509 |
| 2006/0023915 A1* | 2/2006 | Aalbu et al. | 382/103 |
| 2006/0031368 A1* | 2/2006 | deCone | 709/207 |
| 2006/0179410 A1* | 8/2006 | Deeds | 715/750 |
| 2008/0020718 A1* | 1/2008 | Jin et al. | 455/90.2 |
| 2009/0094367 A1* | 4/2009 | Song et al. | 709/227 |
| 2009/0282147 A1* | 11/2009 | Morris | 709/224 |
| 2010/0317334 A1* | 12/2010 | Tai et al. | 455/418 |
| 2012/0117153 A1* | 5/2012 | Gunasekar et al. | 709/204 |
| 2013/0346084 A1* | 12/2013 | Archambault et al. | 704/275 |

OTHER PUBLICATIONS

Kim P. et al, IMS-based Push-to-Talk over GPRS/UMTS, Wireless Communications and Networking Conference; 2005 IEEE New Orleans, LA, USA March 13-17, 2005; Piscataway, NJ; USA; IEEE (Mar. 13, 2005), pp. 2472-2477, XP010791564, ISBN 0780389662.

* cited by examiner

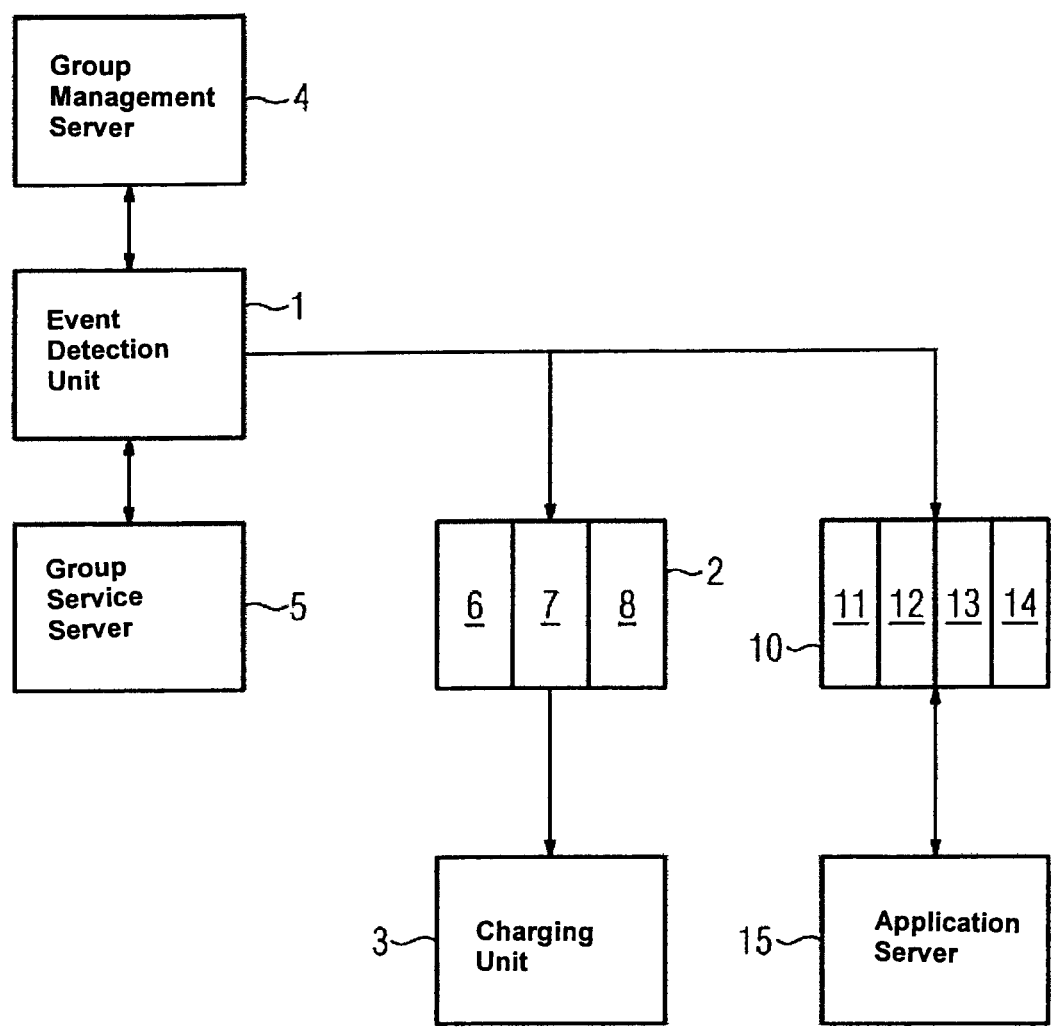

METHOD AND DEVICE FOR OPERATING A GROUP SERVICE IN A COMMUNICATIONS NETWORK

CROSS REFERENCE TO RELATED APPLICATIONS

This application is based on and hereby claims priority to German Application 10 2005 044 857.7 filed on Sep. 13, 2005, and PCT/EP2006/066196 filed on Sep. 8, 2006, the contents of which are hereby incorporated by reference.

BACKGROUND OF THE INVENTION

Various services referred to as group services are known in communication networks, such as third generation mobile radio networks. These are services which are used by participants or members in a group. Examples of group services which are known in mobile radio networks are Instant Messaging (IM), Push-to-Talk-over-Cellular (PoC), gaming applications or else the "Presence" service. In this case, the data from the group service can be transmitted from and/or to the participants in the group either on a packet-switched basis or else on a circuit-switched basis, depending on the respective group service.

Various services and applications are currently being standardized for the mobile radio sector within the framework of the "Open Mobile Alliance (OMA)". In addition to individual group services, such as Push-to-Talk-over-Cellular, the OMA is also developing specifications which are relevant to the general architecture of group services. Thus, section 5.1.3 of the document "XML Document Management Requirements, Candidate Version 1.0-17 Mar. 2005, Open Mobile Alliance, OMA-RD-XDM-V1_0-20050317-C" discloses the option of defining groups which can be used for a plurality of group services. Thus, by way of example, one and the same group can be used for the group services Instant Messaging and Push-to-Talk-over-Cellular.

SUMMARY

One potential object is to specify a more flexible and improve method for operating a group service in a communication network.

The inventors propose a method for operating a group service or a plurality of group services in a communication network, having the following steps: group-service-specific and/or group-specific event data are captured in an event detection unit, at least one subset of the group-service-specific and/or group-specific event data is transmitted from the event detection unit to a group list generation unit, and the group-service-specific and/or group-specific event data are evaluated and group-specific lists are generated by the group list generation unit, the group-specific lists indicating the current participation state of the participants in the group for the group service or each of the group services.

The object of the group list generation unit is to evaluate the group-service-specific and/or group-specific event data and, on the basis of these data, generate group-specific lists for the group service or each of the group services which indicate the current participation state of the participants in the group. In this context, the term "group-service-specific" is to be understood to mean that group-service-specific event data are specific not only to the respective group but also to the respective group service. By way of example, the group-specific event data can become group-service-specific by virtue of their being captured separately for various group services, or the respective group service used being identified in the group-specific event data. By way of example, group-service-specific event data may be information indicating that a participant is leaving an ongoing session of a group service (for example by switching off his terminal and hence ending his participation in a PoC session) or is joining an ongoing group service, such as an IM session. An example of a group-specific event is the removal of a participant from the group.

By way of example, the participation state of a participant may therefore be characterized by his participation ("active") or non-participation ("inactive") in an ongoing group activity provided by a group service, such as a PoC or IM session. In this case, each participant appears in the group-specific list, this list containing, for each participant in the group, an explicit statement relating to his participation state for the various group services. Secondly and preferably, the group-specific list may also respectively show only the participants who are active for the respective group service, i.e. in this case the participation state is provided by virtue of the active participants being shown in the list and the inactive participants not being shown. In addition, the group-specific lists may also be split into appropriate group-service-specific lists, i.e. in this case there is a respective separate list for each of the group services.

The method is advantageous because it allows central generation and management of group-specific lists, indicating the current participation state of the participants in the group, for the group service or each of the group services. Hence, a central form can be used to provide the information regarding which participants in a group are currently involved in a group service. The relevant information can therefore be made available to the widest variety of applications and users by the group list generation unit, which would otherwise require nonuniform access to the respective group services by the applications and the users. This would severely restrict the interoperability and expandability, which is avoided in line with the proposed method.

In general, it can be considered that the event detection unit and the group list generation unit, and also the other units used within the context of advantageous developments of the method, are primarily logical units. This means that a unit is characterized by its function and not by its specific hardware-related implementation. It is thus possible, by way of example, for the event detection unit and the group list generation unit to be in the form of separate, possibly even physically apart, apparatuses or else implemented wholly or in part in the same technical apparatus.

The method may preferably proceed in a manner such that the group-specific lists are stored in the group list generation unit. This is advantageous because the group-specific lists are therefore kept for later use by applications or users and for possible further processing or revision by the group list generation unit, for example.

Preferably, the method is in a form such that the group-service-specific and/or group-specific event data are logged by the event detection unit and at least the subset of the group-service-specific and/or group-specific event data is transmitted from the event detection unit to the group list generation unit. This embodiment affords the advantage that the group-service-specific and/or group-specific event data do not necessarily need to be transmitted to the group list generation unit by the event detection unit directly after they have been captured. In addition, the log of the group-service-specific and/or group-specific event data can be used to catch up on or repeat the transmission of at least the subset of the group-service specific and/or group-specific event data to the group list generation unit at a later time when the connection between the event detection unit and the group list generation unit has failed for a limited time, or the group list generation unit itself has failed for a limited time.

The method may advantageously be in the form such that at least the subset of the group-service-specific and/or group-specific event data is transmitted from the event detection unit to the group list generation unit in each case directly after it has been captured. The direct transmission of at least the subset of the group-service-specific and/or group-specific event data to the group list generation unit is preferred because this ensures that the group list generation unit has the current event data available for evaluation at any time. In this case, the relevant event data can, besides being directly transmitted to the group list generation unit, preferably additionally be logged in the event detection unit.

The method may also proceed in a manner such that the evaluation of the group-service-specific and/or group-specific event data and the generation of the group-specific lists by the group list generation unit take place in each case directly after at least the subset of the group-service-specific and/or group-specific event data has been received. This embodiment is preferred because it means that directly after at least the subset of the group-service-specific and/or group-specific event data has been received, i.e. without any time delay, the group-specific lists are generated for the group service or each of the group services in respect of the current participation state of the participants in the group and can be made available to applications or users.

In another preferred embodiment, the method proceeds in a manner such that the evaluation of the group-service-specific and/or group-specific event data and the generation of the group-specific lists by the group list generation unit take place after a request for transmission of a list of the participants who are active for the respective group service or the group services of a group has been received. This is advantageous because the group-specific lists are therefore generated not constantly, i.e., in each case after at least the subset of the event data has been received, but rather only upon an appropriate request. In this case, the transmission of at least the subset of the group-service-specific and/or group-specific event data from the event detection unit can preferably also be initiated by the group list generation unit after the request has been received, which means that the relevant transmission likewise takes place only in the presence of the request for transmission of the list of the participants who are active for the respective group service or the group services in a group.

The method may preferably also proceed in a manner such that at least the charging-related group-service-specific and/or the charging-related group-specific event data are additionally transmitted from the event detection unit to a group charge processing unit and the charging-related group-service-specific and/or the charging-related group-specific event data are evaluated by the group charge processing unit and use-dependent and participant-specific charging data are generated by the group charge processing unit. The task of the group charge processing unit is to evaluate the charging-related component of the group-specific event data and, on the basis of these data, to generate use-dependent and participant-specific charging data. This advantageously allows participant-specific charging to be performed for group services too on the basis of differentiated criteria.

In another preferred embodiment, the method may also proceed in a manner such that at least charging-related group-service-specific and/or at least charging-related group-specific event data are transmitted from the event detection unit to the group charge processing unit in each case directly after they have been captured. Transmitting the respective event data directly after they have been captured is advantageous because they are therefore available in real time for evaluation by the group charge processing unit. This also allows use-dependent and participant-specific charging of the participants in the group service for what are known as prepaid customers, who require the charges to be calculated in real time owing to the use of prepaid accounts.

The method may preferably also be in the form such that the charging data are transmitted from the group charge processing unit to at least one charging unit for the purpose of participant-specific postprocessing. The charging unit is preferably the data processing system used as standard by the respective service provider or network operator for the purpose of tariff fixing and charging. Preferably, the use-dependent and participant-specific charging data for a participant in a group service are therefore processed further and postprocessed in each case together with those charging data for the participant which do not arise from the use of group services.

In another preferred embodiment, the method may also proceed in a manner such that the event detection unit used is a group management server on which the data relevant for setting up and managing the group of the group service are stored. This embodiment of the method is advantageous because the group management server already provides a component which stores group-specific information. Additional use of the group management server as an event detection unit is preferred because this avoids the introduction of an additional component. All the information which is specific to the participants in the group can therefore be managed at a central location.

Alternatively, in another preferred embodiment of the method, the event detection unit used may be a group service server which provides the group service for the group using the communication network. This embodiment is preferred because the group service server directly records all the event data connected to use of the group service. There is therefore no transmission of the group-specific event data to a separate event detection unit. Provided that a group service server provides several types of group services, the group-specific event data for a plurality of group services can be captured in the same event detection unit. If different group services are provided by various group service servers, however, it may be preferred for the event detection unit to be implemented as an individual separate, preferably central, component or as part of the group management server.

By way of example, the communication network may be a landline telecommunication network or the Internet. However, particular preference is given to the embodiment of the method in which the communication network used is a mobile radio network.

In another preferred embodiment of the method, the group service is operated across the boundary of the communication network. This means that the participants in the group may also be customers of different network operators or service providers, i.e. a group service can be operated in a plurality of mobile radio networks, for example. In addition, the group service may also be operated quite generally across network boundaries. This means that the participants in a group can use different transport mechanisms and access technologies when using a group service. An example of this is a group which comprises participants from a mobile radio network, a landline network and the Internet.

The inventors also propose an arrangement for operating a group service in a communication network.

In this respect, the invention is based on the object of specifying a more flexible and improved arrangement for operating a group service in a communication network.

The invention achieves this object by an arrangement for operating a group service or a plurality of group services in a communication network, with capture of group-service-specific and/or group-specific event data in an event detection unit and with a group list generation unit, connected to the event detection unit, with a reception unit to receive at least one subset of the group-service-specific and/or group-specific event data from the event detection unit, an analysis unit for evaluating the group-service-specific and/or group-specific event data, and a group list generation unit for generating group-specific lists, the lists indicating the current participation state of the participants in the group for the group service or each of the group services. In this case, the subset of the group-service-specific and/or group-specific event data may be the component of the relevant data which is relevant for the generation of the group-specific lists, i.e. relates to the participation state of participants in the group in the group service or one of the group services.

The arrangement affords the advantage that it allows the group list generation unit, as the central component, to create lists regarding the current participation state of the participants in a group in a group service used by the group or a plurality of group services used by the group. The relevant information can be used for different applications and by different users. Preferably, the group list generation unit is a group-service-spanning unit such that the participation state for all activities in the group, i.e. for all group services, is ascertained at a central location.

The arrangement may preferably also be in a form such that it has a memory associated with the group list generation unit for storing the group-specific lists. This is advantageous because it allows the group-specific lists to be kept in the memory for later use. In addition, it is thus merely necessary to update the lists of the newly received data when new event data have been received.

In another preferred embodiment of the arrangement, the event detection unit is designed to transmit at least the subset of the group-service-specific and/or group-specific event data to the group list generation unit in each case directly after it has been captured. On the basis of the previous implementations, this is advantageous because the relevant data are therefore available to the group list generation unit without any time delay.

Advantageously, the arrangement is in a form such that the analysis unit is designed to evaluate the group-service-specific and/or group-specific event data, and the group list generation unit is designed to generate the group-specific lists in each case directly after at least the subset of the group-service-specific and/or group-specific event data has been received. This embodiment is preferred because it allows the group-specific lists to be updated directly after a change in the participation state of one or more participants in the group in the group service or a plurality of group services.

Alternatively, the arrangement may preferably also be in a form such that the analysis unit is designed to evaluate the group-service-specific and/or group-specific event data, and the group list generation unit is designed to generate the group-specific lists after a request for transmission of a list of the participants who are active for the respective group service has been received. This affords the advantage that the group-service-specific and/or group-specific event data are transmitted from the event detection unit to the group list generation unit in each case only after a request for transmission of the group-specific list has been received, which minimizes the number of data transmission operations. In this context, the request can be made by an application or user, for example.

In one particularly preferred embodiment of the arrangement, the event detection unit is additionally designed to transmit at least charging-related group-service-specific and/or at least charging-related group-specific event data to a group charge processing unit, and the group charge processing unit is designed to evaluate at least the charging-related group-service-specific and/or at least the charging-related group-specific event data and to generate use-dependent and participant-specific charging data. This embodiment of the arrangement is advantageous because it allows use-dependent charging of the participants in the group service.

Preferably, the arrangement may also be in a form such that the event detection unit is designed to transmit at least the charging-related group-specific and/or at least the group-service-specific event data to the group charge processing unit in each case directly after they have been captured. Transmitting the charging-related group-specific event data or the charging-related group-service-specific event data in real time to the group charge processing unit is preferred because this allows what are known as prepaid participants, for whom the charging is performed using prepaid accounts, to be charged in real time, for example. It should be pointed out that even when such a prepaid system is used it is possible for the group-specific and/or the group-service-specific event data to be logged in parallel. In this case, however, this logging is not used to generate use-dependent and participant-specific charging data, at least for the prepaid participants, but rather can be used for other applications.

Preferably, the arrangement is in a form such that the group charge processing unit has a charging unit connected to it for receiving the charging data and for postprocessing them on a participant-specific basis. This embodiment is advantageous because it allows the use-dependent and participant-specific charging data generated by the group charge processing unit's charging data means to be processed further in similar fashion to data which do not arise from the use of group services. This makes it possible to produce a bill for a participant which includes both the charges incurred for using group services and the charges incurred for using other services.

Preferably, the arrangement is in a form such that the event detection unit is a group management server on which the data relevant for setting up and managing the group of the group service are stored. As already described in connection with the method, the use of the group management server as event detection unit affords the advantage that all data relating to a group's management and charging are stored or captured at a central location.

In another preferred embodiment of the arrangement, the event detection unit is a group service server which provides the group service for the group using the communication network. This affords the advantage that the group services' event data are captured by the event detection unit directly at their point of origin.

The arrangement may preferably be in a form such that the communication network is a mobile radio network.

BRIEF DESCRIPTION OF THE DRAWINGS

These and other objects and advantages of the present invention will become more apparent and more readily appreciated from the following description of the preferred embodiments, taken in conjunction with the accompanying drawing of which:

The FIGURE shows an event detection unit 1 which is connected both to a group management server 4 and to a group service server 5. This involves an electrical connection which may be in wired or wireless form.

DETAILED DESCRIPTION OF THE PREFERRED EMBODIMENT

Reference will now be made in detail to the preferred embodiments of the present invention, examples of which are illustrated in the accompanying drawings, wherein like reference numerals refer to like elements throughout.

The group management server 4 stores all data relevant to the setup and management of a group. Thus, in group services, which are also referred to as group-based services, such as Instant Messaging (IM), the participants are usually firmly associated with groups, i.e. there are firm group definitions. In the case of an Instant Messaging service, such a group definition can be used, by way of example, to permit communication with the other group members. This means that only participants in the group are permitted to communicate. In addition, the group can also be used to monitor what is known as the presence status of the other participants in the group. This means that the participant's membership of the group declares that he agrees to other participants being able to monitor his presence state. By way of example, this can be done by indicating whether or not the relevant participant in the group can currently be reached using a particular communication method (E-mail, IM, mobile radio telephone, etc.). The group service server 5 is used for executing the group service and distributes the group service's messages via the communication network used by the participants for communication. In this case, the group service server 5 is notified of the group-service-specific addresses of the participants or members in the group by the group management server 4.

In the exemplary embodiment shown, the event detection unit 1 can receive group-service-specific event data both from the group management server 4 and from the group service server 5, i.e. in the exemplary embodiment shown the captured event data are specific not only to the respective group but also to the respective group service. It should be pointed out that the event detection unit 1 will usually capture both group-service-specific event data and group-specific event data, however. The event data can be sent from the group management server 4 and the group service server 5 to the event detection unit 1 or can be requested from the group management server 4 and the group service server 5 by the event detection unit 1. In addition, it is also possible for the event detection unit 1 to capture the event data by recording messages interchanged between the group management server 4 and the group service server 5.

It should be pointed out that the event detection unit 1 may, as an alternative to the illustration in the FIGURE, also be implemented as part of the group management server 4 or of the group service server 5. In general, it should once again be pointed out at this juncture that the components shown are logical units which do not necessarily need to be implemented in separate hardware components. The group-service-specific event data, which preferably contain a time stamp identifying the time at which the respective event has occurred, may contain information regarding the following events or questions, for example:
  which participant set up the relevant group?
  which participant has been included in the group?
  which participant has left the group?
  which participant has distributed what data?
  which participant has sent what messages and what was the data volume of the relevant messages?
  which participant has received what messages and what was the data volume of the relevant messages?

If the group service is what is known as a chat service, for example, appropriate event data can be captured on the basis of the setup of a chat room, the period spent in the chat room or else the joining or leaving of the chat room, for example.

The number of participants will change, normally dynamically over time, during the period for which a group service is active. It is thus highly probable in the case of the stated example of a chat service that not all the participants in the firmly defined group will be participating in this activity. By way of example, the reason for this may be that not all of the firmly defined group members are available for the time. In addition, it is also conceivable for other participants to participate in the group activity (i.e. the use of the group service) who are not part of the firmly defined group. These participants included in the group activity in another way may have joined the group activity as a result of a direct invitation from one of the participants in the group, for example. In the course of the group activity, the participants, for example, may now wish to change the group service used for communication with the currently active participants. By way of example, an IM session might turn out to be too laborious and unproductive and there might therefore be a desire to change over to another group service, such as Push-to-Talk-over-Cellular (PoC). However, for a corresponding change of group service to be able to be made, it is a prerequisite that the component which wishes to make the change of service knows which participants are currently actively involved in the group activity. Furthermore, many other instances of application are conceivable in which the information is required regarding which participants are currently participating in a group service of the group.

In addition, the event detection unit 1 is connected to a group list generation unit 10. The captured group-service-specific event data are transmitted from the event detection unit 1 to the group list generation unit 10. This does not necessarily require all group-service-specific event data to be transmitted but rather it is also possible for just a subset to be transmitted. To this end, the event detection unit 1 can make a selection of those group-service-specific event data which are relevant to the participation state of a participant in the group in the relevant group service. In this case, the corresponding selection can be made on the basis of various criteria, such as the type of event. Alternatively, an appropriate selection of event data may also not be made until after the transmission by the group list generation unit 10.

The group list generation unit 10 has a reception unit 11 for receiving at least the subset of the group-service-specific event data from the event detection unit 1 and also analysis unit 12 for evaluating the group-service-specific event data. As a result of the evaluation, group list generation unit 13 generates group-specific lists, the lists indicating the current participation state of the participants in the group for the group service or each of the group services. Furthermore, the group list generation unit 10 has a memory 14 for storing the group-specific lists.

The group list generation unit 10 also has an application server 15 connected to it. The application server 15 executes a software application which, to perform its function, i.e. to change the group service used, for example, requires the list of a group's participants who are currently active for a group service. To this end, the application server 15 sends a request message to the group list generation unit 10. The latter reads the corresponding group-specific list from the memory 14 and transmits it in a response message to the application server 15. Alternatively, the group list generation unit 10 could also not request the group-specific event data until after the request message has been received from the event detection unit 1. In this case, the event detection unit 1 has logged the event data and transfers the log on the basis of the request to the group list generation unit 10. It should be pointed out that the group-specific list can also be split over a plurality of group-service-specific lists. In the latter case, there is therefore a separate list for each group service, said list identifying the participants who are active for this group service, whereas in the case of a group-specific list the relevant information is pooled for the group services used by the participants in the group. The use of the group list generation unit 10 therefore affords the advantage that the application server 15 requires only one interface or connection to the group list generation unit 10, and not separate connections to possibly a multiplicity of different group service servers, for example, regardless of the group service for which it wishes to request the list of active participants in a group. This facilitates the interplay between the relevant units and is therefore advantageous particularly also in terms of facilitated extendability.

In the exemplary embodiment shown in the FIGURE, the captured group-service-specific event data are furthermore transmitted from the event detection unit 1 to a group charge processing unit 2. In this case, it is again not imperative to transmit all the group-service-specific event data, but rather just the charging-related component can also be transmitted. In this regard, the event detection unit 1 can select those group-service-specific event data which are relevant to the charging. The corresponding selection can likewise be made on the basis of various criteria, such as the type of event. Alternatively, it is also possible for a corresponding selection of event data not to be made until after the transmission by the group charge processing unit 2.

The group charge processing unit 2 has a reception unit 6 for receiving the group-service-specific event data and an analysis unit 7 for evaluating the charging-related group-service-specific event data. As the result of the evaluation, a charging data unit 8 in the group charge processing unit 2 generates use-dependent and participant-specific charging data. These charging data are transmitted for the purpose of participant-specific postprocessing from the group charge processing unit 2 to the charging unit 3.

The charging unit 3 postprocesses the charging data conditioned by the group charge processing unit 2. If the participants in the group are customers of different service providers or different network operators, the charging data for the respective participants can also be transmitted to a plurality of different charging units. Alternatively, it is also possible for the actual event detection unit 1 to perform service-provider-dependent and/or network-operator-dependent filtering of the event data and to transmit the relevant event data to various group charge processing units 2.

If the participants in the group service are postpaid participants, the group-service-specific event data are written from the event detection unit 1 to a log. In this case, the log preferably contains all the group-service-specific event data or else at least all the charging-related group-service-specific event data. The event detection unit 1 can store the log in the form of what is known as a log file or in a database, for example. In this case, the dynamic processes relating to the group or to the use of the group service are preferably provided with a time stamp, which records which participant has used the respective group service in what form and at what time. The transmission of the group-service-specific or the charging-related group-service-specific event data from the event detection unit 1 to the group charge processing unit 2 can in this case be effected by setting up an FTP connection with subsequent loading of the log onto the group charge processing unit 2, for example.

If the participants in the group service are participants with prepaid accounts (known as prepaid participants), the event detection unit 1 sends the charging-related group-service-specific event data to the group charge processing unit 2 directly after they have been captured. In this case, the group charge processing unit 2 may be part of a prepaid system, or else may be connected upstream of it as a separate logical functional unit. The charging-related group-service-specific event data are in this context transmitted to the prepaid system with as short a time delay as possible so that there is the assurance that the use of the group service is always covered by an appropriate prepaid credit for the participant. In this case, messages containing the event data can be sent from the event detection unit 1 to the group charge processing unit 2 at the same time as the relevant information is possibly additionally written to a log. As an alternative to the messages being sent by the event detection unit 1, it is also possible for the event detection unit 1 to be continually polled by the group charge processing unit 2 or by an additional interposed component. Furthermore, event-controlled remote monitoring of the log stored on a shared file system in this case is also conceivable, for example. A crucial factor each time in this context is that the charging data are generated and transmitted to the prepaid system, which has access to the accounts of the participants, in real time.

If not all the participants in a group have prepaid accounts, it is also possible to support postpaid participants at the same time. In this case, the charging-related group-service-specific event data which are preferably additionally stored in the log can be transmitted to an appropriately designed group charge processing unit 2 which supports both prepaid and postpaid participants. For this, the group charge processing unit 2 can have different charging units 3 connected to it, e.g. one for prepaid participants and one for postpaid participants, respectively. If a charging unit 3 supports both types of participants, different group charge processing units 2 for prepaid participants and for postpaid participants are not required.

It should be pointed out that the group list generation unit 10 and the group charge processing unit 2 may also be in the form of one common unit, since, as already explained previously, the units illustrated are logical units. In this case, it is no longer necessary to transmit the group-service-specific event data or a respective subset thereof from the event detection unit 1 both to the group list generation unit 10 and to the group charge processing unit 2. Furthermore, it is also additionally possible for the event detection unit 1 to be implemented in the same component, so that the event data are captured and appropriately evaluated by one common component.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in Superguide v. DIRECTV, 69 USPQ2d 1865 (Fed. Cir. 2004).

The invention claimed is:
1. A method of operating a group service or a plurality of group services in a communication network, comprising:
   capturing group-service-specific and/or group-specific event data in an event detection unit;
   transmitting at least one subset of the group-service-specific and/or group-specific event data from the event detection unit to a group list generation unit that is applicable to a plurality of types of communication group services; and evaluating the group-service-specific and/or group-specific event data and generating group-specific lists by the group list generation unit, the group-specific lists indicating a current participation state of members of the group in the group service or each of the communication group services, wherein current participation state data is obtained, for the plurality of types of communication group services at a centralized location, after a change in a participation state occurs from a type of communication group service to a different type of communication group service, and information regarding which members are currently involved in which of the types of communication group services is made available to different applications and users in a standard manner.

2. The method as claimed in claim 1, further comprising storing the group-specific lists in the group list generation unit.

3. The method as claimed in claim 1, wherein
the group-service-specific and/or group-specific event data are logged by the event detection unit.

4. The method as claimed in claim 1, wherein at least the subset of the group-service-specific and/or group-specific event data is transmitted from the event detection unit to the group list generation unit in each case directly after being captured.

5. The method as claimed in claim 1, wherein
the group list generation unit evaluates the group-service-specific and/or group-specific event data and generates the group-specific lists in each case directly after at least the subset of the group-service-specific and/or group-specific event data has been received.

6. The method as claimed in claim 1 wherein
the group list generation unit receives a request for information regarding members who are active in at least one of the group services, and
the group list generation unit evaluates the group-service-specific and/or group-specific event data and generates the group-specific lists only after the group list generation unit receives the request for information.

7. The method as claimed in claim 1, wherein
charging-related group-service-specific and/or charging-related group-specific event data is transmitted from the event detection unit to a group charge processing unit, and
the group charge processing unit evaluates the charging-related group-service-specific and/or the charging-related group-specific event data and generates use-dependent and participant-specific charging data.

8. The method as claimed in claim 7, wherein
the charging-related group-service-specific and/or at least the charging-related group-specific event data are transmitted from the event detection unit to the group charge processing unit in each case directly after they have been captured.

9. The method as claimed in claim 7, wherein
the charging data are transmitted from the group charge processing unit to at least one charging unit for participant-specific post-processing.

10. The method as claimed in claim 1, wherein
the event detection unit is a group management server on which data relevant to setting up and managing the group services are stored.

11. The method as claimed in claim 1, wherein
the event detection unit is a group service server which provides the group service to the group using the communication network.

12. The method as claimed in claim 1, wherein
the communication network used is a mobile radio network.

13. The method as claimed in claim 1, wherein
the group service is operated across a boundary of the communication network.

14. A system to operate a group service or a plurality of group services in a communication network, comprising:
an event detection unit to capture group-service-specific and/or group-specific event data; and
a group list generation unit, connected with the event detection unit, comprising:
a reception unit to receive at least one subset of the group-service-specific and/or group-specific event data from the event detection unit;
an analysis unit to evaluate the group-service-specific and/or group-specific event data for a plurality of types of communication group services; and
a multi-group service unit to generate group-specific lists indicating a current participation state of members of the group in the group service or each of the communication group services,
wherein current participation state data is obtained, for the plurality of types of communication group services at a centralized location, after a change in a participation state occurs from a type of communication group service to a different type of communication group service, and information regarding which members are currently involved in which of the types of communication group services is made available to different applications and users in a standard manner by the group list generation unit.

15. The system as claimed in claim 14, further comprising:
a memory associated with the group list generation unit to store the group-specific lists.

16. The system as claimed in claim 14, wherein
the event detection unit transmits at least the subset of the group-service-specific and/or group-specific event data to the group list generation unit in each case directly after it has been captured.

17. The system as claimed in claim 14, wherein
the analysis unit evaluates the group-service-specific and/or group-specific event data and the multi-group service unit generates the group-specific lists in each case directly after at least the subset of the group-service-specific and/or group-specific event data has been received.

18. The system as claimed in claim 14, wherein
the group list generation unit receives a request for information regarding members who are active in at least one of the group services, and
the analysis unit evaluates the group-service-specific and/or group-specific event data and the multi-group service unit generates the group-specific lists after the request for information has been received.

19. The system as claimed in claim 14, wherein
the event detection unit is captures and transmits at least charging-related group-service-specific and/or at least charging-related group-specific event data to a group charge processing unit, and
the group charge processing unit evaluates the charging-related group-service-specific and/or at least the charging-related group-specific event data and generates use-dependent and participant-specific charging data.

20. The system as claimed in claim 19, wherein the event detection unit transmits the charging-related group-service-specific and/or at least the charging-related group-specific event data to the group charge processing unit directly after being captured.

21. The system as claimed in claim 19, wherein the group charge processing unit has a charging unit connected with it to receive the charging data and post-processing the charging data a participant-specific basis.

22. The system as claimed in claim 14, wherein the event detection unit is a group management server on which data for setting up and managing the group services are stored.

23. The system as claimed in claim 14, wherein the event detection unit is a group service server which provides the group service to the group using the communication network.

24. The system as claimed in claim 14, wherein the communication network is a mobile radio network.

* * * * *